March 13, 1962     J. L. NITSCH     3,024,533

CUTTING BLADE

Filed June 10, 1959

INVENTOR.
JOSEPH L. NITSCH
BY JOHN P. MURPHY
ATTORNEY

United States Patent Office 3,024,533
Patented Mar. 13, 1962

3,024,533
CUTTING BLADE
Joseph Leonard Nitsch, 403 Berwick Road S.,
Syracuse 8, N.Y.
Filed June 10, 1959, Ser. No. 819,297
1 Claim. (Cl. 30—355)

This invention relates to a cutting blade, and more particularly, to a cutting blade adapted for efficient performance in the cutting and slicing of various types of food materials.

During the last several years the industry has made various attempts to provide a cutting blade, such as for a knife or for a machine, which would be adapted to properly and efficiently cut and slice a variety of types of food materials. It is well known that certain foods are adapted to be sliced with a smooth continuous cutting edge. Cold meats such as sausage and bologna are examples. Foods such as breads and certain other baked goods are more properly sliced with a serrated or scalloped cutting edge. Certain other foods are properly cut or sliced with a toothed, saw-blade cutting edge. However many variations of the above types of cutting edges are provided, it remains for the user to select the proper one in order to properly and efficiently cut or slice the food without tearing or crumbling the same. If the user cuts bologna with a saw-tooth edge, much of the meat is torn away by the teeth and a smoothly made cut is not obtained. If breads and certain other baked goods are cut with the wrong type of cutting edge, the food becomes torn rather than cut by the edge. Furthermore, a slicing blade should be formed very thin to provide a keen edge, thus increasing the susceptibility of the blade to become damaged such as by nicks and the like. A serrated or toothed blade must of necessity be formed relatively thick, thus rendering it useless for slicing certain types of foods.

It is therefore an object of this invention to provide a cutting blade which overcomes the above shortcomings.

It is another object of this invention to provide a cutting blade which is adapted for proper and efficient use when cutting or slicing several types of foods.

It is yet a further object of this invention to provide a cutting blade having a combination edge which is adapted for the proper cutting or slicing of both soft and tough food materials.

In carrying out the above objects, there is provided a cutting blade having a cutting edge which is scalloped lengthwise forming a row of spaced peaks having arc-shaped spans therebetween and being provided with secondary cutting teeth formed from said scalloped cutting edge.

Figure 1:
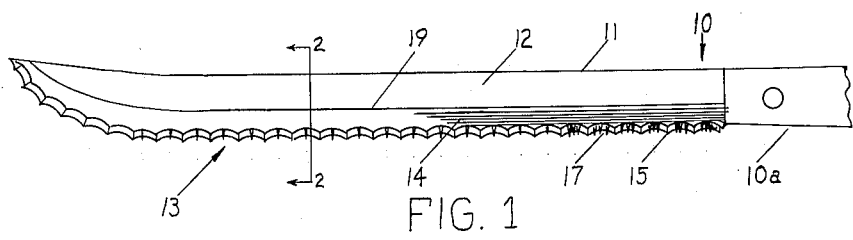
FIGURE 1 is a side elevation of a cutting blade according to one embodiment of this invention.
Figure 2:
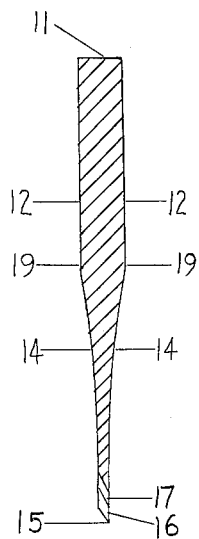
FIGURE 2 is a transverse cross sectional view of the embodiment of FIGURE 1, taken along the line 2—2.
Figure 3:
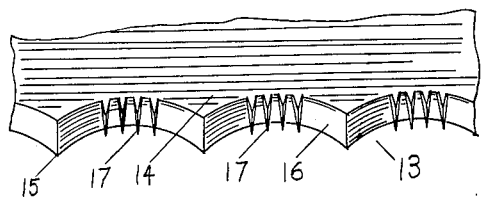
FIGURE 3 is an enlarged view of a portion of the cutting edge of the embodiment of FIGURE 1.

The number 10 generally indicates a cutting blade, in this case formed as a knife having the usual handle 10a. The blade 10 comprises an elongated thin body having a back edge 11, generally parallel and oppositely disposed sides 12, and a cutting edge which is generally designated as 13. A portion of each side of the blade 10 is hollow ground as at 14, most clearly seen in FIGURE 2, and extends from a longitudinal edge 19 downwardly to the cutting edge 13. Thus, the surfaces of the portions 14 present a concave face to the viewer. The purpose of the hollow ground portions 14 is to retain the generally parallel sides 12 and thick portion at the back edge 11, while providing for a thin cross section at the cutting edge 13.

The cutting edge 13 is then scalloped to form a row of sharp points 15 spaced by arc-shaped spans 16. The cutting edge 13 is sharpened by honing or grinding to form a beveled edge of acute sharpness. This sharp edge 13 extends continuously the length of the blade.

Thus far there is provided a cutting blade having an elongated body with a back edge, generally parallel sides, and a cutting edge 13 having a beveled edge which is scalloped to form sharp pointed teeth 15 spanned by arc-shaped spans 16. In this manner there is provided a cutting blade serving a dual purpose. The continuous sharp cutting edge is adapted for the slicing of the types of foods which are conventionally sliced with a straight-edged blade; and the scalloped edge imparts to the blade all of the advantages of the conventional bluntly-scalloped blade.

The cutting blade 10 of this invention is further characterized by the provision of secondary cutting teeth 17 which are formed on each span 16 of the cutting edge 13. The teeth 17 are sharp-pointed and extend outwardly from the cutting blade 10 in the direction of the cutting edge 13. The secondary teeth 17 are formed to extend beyond the cutting edge 13, and are sharp-edged as by honing so that the cutting edge 13 extends continuously from any given point 15 along the span 16, around each secondary cutting tooth 17, and along the span 16 to the next point 15.

Therefore, the cutting blade 10 of this invention has a continuous cutting edge 13 throughout the length of the blade 10, is scalloped to form a row of sharp pointed teeth 15 spaced apart by arc-shaped spans 16, and has formed on each said span 16 secondary cutting teeth 17 which are sharp-pointed and extend outwardly beyond the said cutting edge 13.

When the cutting blade of this invention is used on soft foods such as bologna and sausage and the like, the continuous cutting edge 13 permits the foods to be properly sliced with a smooth cut, and particles of the food are not torn away by the secondary cutting teeth 17. This is due to the fact that the cutting edge 13 is continuous around the periphery of the teeth 17. When the cutting blade is used for breads and certain baked goods, the continuous cutting edge 13, in combination with the points 15 and the secondary cutting teeth 17, provide for the proper slicing through of the baked goods by the blade. This is believed to be the result of, in part, the addition of the secondary cutting teeth 17, which increase the length of the cutting edge 13, and the combination of the scalloped edge and the teeth 17. The smooth cutting edge 16 and the points 15 do the slicing, while the teeth 17 do the sawing through the crust or the like. The teeth 17, however, do not saw the crumbly material of the baked goods inasmuch as a smooth cut is first made by the points 15 and span 16. Certain other foods which may normally be partially cut by a smooth cutting edge, but which are more easily cut or sliced by a saw tooth cutting edge; are easily cut and sliced with the cutting blade of the present invention. It will become apparent that the present blade 10 forms an initial cut with the points 15 and span 16 and then properly and efficiently finishes cutting or slicing the food.

It is to be understood that the invention is not to be limited to the embodiment shown and described, but is to be construed as falls within the scope of the appended claim.

It is claimed:

A cutting blade comprising an elongated thin body having a back edge, parallel sides, and a cutting edge, said sides being partially hollow ground from the parallel sides downwardly to said cutting edge thus presenting concave faces; said cutting edge being scalloped lengthwise to form a row of sharp points, said points being spaced by arc-shaped spans, said spans being sharpened to form a beveled cutting edge extending continuously the length of the blade, and said cutting edge being provided with secondary cutting teeth, said teeth being formed on each of said arc-shaped spans, and projecting beyond the edge thereof.

References Cited in the file of this patent
UNITED STATES PATENTS

| | | |
|---|---|---|
| 556,615 | Campbell | Mar. 17, 1896 |
| 955,050 | Breshahan | Apr. 12, 1910 |
| 2,787,058 | Vogel | Apr. 2, 1957 |
| 2,825,968 | Baer | Mar. 11, 1958 |
| 2,834,108 | Thompson | May 13, 1958 |